(12) United States Patent
Kawada et al.

(10) Patent No.: US 9,517,409 B2
(45) Date of Patent: Dec. 13, 2016

(54) SERVER DEVICE, AND NON-TRANSITORY COMPUTER-READABLE STORAGE MEDIUM STORING GAME PROGRAM

(71) Applicant: DeNA Co., Ltd., Tokyo (JP)

(72) Inventors: Hotaka Kawada, Tokyo (JP); Takashi Ninjouji, Tokyo (JP); Takahiro Otomo, Tokyo (JP)

(73) Assignee: DeNA CO., LTD., Tokyo (JP)

( * ) Notice: Subject to any disclaimer, the term of this patent is extended or adjusted under 35 U.S.C. 154(b) by 5 days.

(21) Appl. No.: 14/165,300

(22) Filed: Jan. 27, 2014

(65) Prior Publication Data

US 2014/0302922 A1    Oct. 9, 2014

(30) Foreign Application Priority Data

Apr. 3, 2013   (JP) .................................. 2013-077561

(51) Int. Cl.
```
A63F 13/00      (2014.01)
A63F 13/35      (2014.01)
A63F 13/795     (2014.01)
A63F 13/48      (2014.01)
A63F 13/46      (2014.01)
A63F 13/44      (2014.01)
```
(52) U.S. Cl.
CPC ............. *A63F 13/35* (2014.09); *A63F 13/46* (2014.09); *A63F 13/48* (2014.09); *A63F 13/795* (2014.09); *A63F 13/44* (2014.09)

(58) Field of Classification Search
CPC ......... A63F 13/20; A63F 13/45; A63F 13/822
USPC .................................................. 463/9, 40–42
See application file for complete search history.

(56) References Cited

U.S. PATENT DOCUMENTS

| | | | |
|---|---|---|---|
| 7,628,688 B2* | 12/2009 | Hinami .............................. 463/9 |
| 2002/0183116 A1* | 12/2002 | Takahashi et al. .............. 463/42 |
| 2006/0265277 A1* | 11/2006 | Yasinovsky et al. ........... 705/11 |
| 2008/0207315 A1* | 8/2008 | Bloebaum et al. ............. 463/29 |
| 2010/0197380 A1* | 8/2010 | Shackleton ..................... 463/22 |

(Continued)

FOREIGN PATENT DOCUMENTS

| | | |
|---|---|---|
| JP | 2008-272448 | 11/2008 |
| JP | 2009-240570 | 10/2009 |

OTHER PUBLICATIONS

Clash of Clans Strategy Guide—Tapscape www.tapscape.com/clash-of-clans-strategy-guide/.*

(Continued)

*Primary Examiner* — David L Lewis
*Assistant Examiner* — Eric M Thomas
(74) *Attorney, Agent, or Firm* — Procopio, Cory, Hargreaves & Savitch LLP

(57) ABSTRACT

A server device according to the present invention is connected with a player terminal through a network, displays, in the player terminal, a screen in which a plurality of types of playable games is listed, receives a reservation registration request of automatic play information in which a game and a start timing specified by the player are set, and perform reservation registration of the automatic play information of the player. The server device determines whether automatically starting a game play of the specified game at the specified start timing based on the automatic play information subjected to the reservation registration, and automatically starts the game play of the game at the start timing when the determination is affirmed.

8 Claims, 13 Drawing Sheets

| EVENT INFORMATION (3) | | | |
|---|---|---|---|
| EVENT INFORMATION (2) | | | |
| EVENT INFORMATION (1) | | | |
| EVENT ID | EVENT DETAILS | EVENT START DATE AND TIME | EVENT END DATE AND TIME |
| 001 | CONSUMED POINT RECOVERY RATE IS INCREASED | 2013/01/09 7:00 | 2013/01/09 8:00 |
| 002 | ABILITY VALUE OF GAME CARD IS TRIPLED | 2013/01/09 18:00 | 2013/01/09 17:00 |
| 003 | LEAGUE PROMOTION AND RELEGATION (RARE ITEM IS GIVEN TO PROMOTED PLAYER TO LEAGUE AS PRESENT) | 2013/01/09 15:00 | 2013/01/09 0:00 |
| ⋮ | ⋮ | ⋮ | ⋮ |

(56) References Cited

U.S. PATENT DOCUMENTS

2013/0053149 A1\* 2/2013 Rouse et al. .................... 463/42
2013/0296048 A1\* 11/2013 Jeffery et al. ................... 463/31
2014/0164142 A1\* 6/2014 Yang .......................... 705/14.69

OTHER PUBLICATIONS

Japanese Patent Application No. 2013-077561: Office Action (Decision to Grant Patent) mailed on Oct. 8, 2013.
Bright Kingdom Online, the second round, LOGiN, Enterbrain, Inc., Sep. 1, 2006, vol. 25, Issue 9, pp. 130-131.
Japanese Patent Application No. 2013-077561: Office Action mailed on Jun. 18, 2013.

\* cited by examiner

FIG. 4

| GAME ID | GAME TITLE | EVENT INFORMATION |
|---|---|---|
| 0001 | GAME A | EVENT INFORMATION(1) |
| 0002 | GAME B | EVENT INFORMATION(2) |
| 0003 | GAME C | EVENT INFORMATION(3) |
| ⋮ | ⋮ | ⋮ |

| EVENT ID | EVENT DETAILS | EVENT START DATE AND TIME | EVENT END DATE AND TIME |
|---|---|---|---|
| 001 | CONSUMED POINT RECOVERY RATE IS INCREASED | 2013/01/09 7:00 | 2013/01/09 8:00 |
| 002 | ABILITY VALUE OF GAME CARD IS TRIPLED | 2013/01/09 18:00 | 2013/01/09 17:00 |
| 003 | LEAGUE PROMOTION AND RELEGATION (RARE ITEM IS GIVEN TO PROMOTED PLAYER TO LEAGUE AS PRESENT) | 2013/01/09 15:00 | 2013/01/09 0:00 |
| ... | ... | ... | ... |

FIG. 6

| CARD ID | CHARACTER NAME | LEVEL | ATTACK STRENGTH | DEFENSE STRENGTH | HIT POINT |
|---|---|---|---|---|---|
| 0001 | WARRIOR A | LV.5 | 500 | 500 | 1000 |
| ⋮ | ⋮ | ⋮ | ⋮ | ⋮ | ⋮ |
| 0100 | WIZARD X | LV.15 | 2000 | 2000 | 8000 |
| ⋮ | ⋮ | ⋮ | ⋮ | ⋮ | ⋮ |
| 0105 | MARTIAL ARTIST Y | LV.16 | 1000 | 1000 | 6000 |
| ⋮ | ⋮ | ⋮ | ⋮ | ⋮ | ⋮ |

FIG. 7

| PLAYER ID | VIRTUAL CURRENCY | MY GAME INFORMATION | AUTOMATIC PLAY INFORMATION |
|---|---|---|---|
| 1 | 1000 | MY GAME INFORMATION (1) | AUTOMATIC PLAY INFORMATION (1) |
| 2 | 700 | MY GAME INFORMATION (2) | AUTOMATIC PLAY INFORMATION (2) |
| 3 | 0 | MY GAME INFORMATION (3) | AUTOMATIC PLAY INFORMATION (3) |
| ⋮ | ⋮ | ⋮ | ⋮ |

FIG. 8

| MY GAME ID | GAME ID | PLAYER LEVEL | FRIEND PLAYER ID | CONSUMED POINT | NUMBER OF RECOVERY ITEMS | RECOVERY TIME OF CONSUMED POINT | POSSESSED CARD INFORMATION |
|---|---|---|---|---|---|---|---|
| 001 | 0001 | LV.10 | 5,8 | 1 | 50 | 20 MINUTES | POSSESSED CARD INFORMATION (1) |
| 002 | 0002 | LV.20 | NONE | 2 | 10 | 30 MINUTES | POSSESSED CARD INFORMATION (2) |
| 003 | 0003 | LV.15 | 3,4,5 | 3 | NONE | 10 MINUTES | POSSESSED CARD INFORMATION (3) |
| ... | ... | ... | ... | ... | ... | ... | ... |

MY GAME INFORMATION (1)
MY GAME INFORMATION (2)
MY GAME INFORMATION (3)

FIG. 9

POSSESSED CARD INFORMATION (3)
POSSESSED CARD INFORMATION (2)
POSSESSED CARD INFORMATION (1)

| POSSESSED CARD ID | LEVEL | ATTACK STRENGTH | DEFENSE STRENGTH | ACQUISITION DATE AND TIME |
|---|---|---|---|---|
| 0011 | LV. 3 | 15 | 10 | 2012/2/13 10:00 |
| 0211 | LV. 4 | 20 | 23 | 2012/2/13 12:00 |
| 0133 | LV. 1 | 70 | 45 | 2012/2/14 11:30 |
| 0201 | LV. 4 | 22 | 40 | 2012/2/15 18:00 |
| 0072 | LV. 7 | 60 | 50 | 2012/2/16 13:30 |
| 0094 | LV. 1 | 300 | 200 | 2012/2/16 19:00 |
| ... | ... | ... | ... | ... |

FIG. 10

| AUTOMATIC PLAY INFORMATION (1) | | | | |
| --- | --- | --- | --- | --- |
| AUTOMATIC PLAY ID | MY GAME ID | GAME START DATE AND TIME | NUMBER OF CONSUMED POINTS | NUMBER OF RECOVERY ITEMS TO BE USED |
| 001 | 001 | 2013/01/09 12:00 | 1 | 3 |
| 002 | 001 | 2013/01/09 17:00 | 3 | – |
| 003 | 002 | 2013/01/09 12:00 | 3 | 6 |
| ... | ... | ... | ... | ... |

AUTOMATIC PLAY INFORMATION (2)

AUTOMATIC PLAY INFORMATION (3)

FIG. 11

| SCHEDULE ID | TIME PERIOD | GAME ID | GAME TITLE | EVENT ID |
|---|---|---|---|---|
| ⋮ | ⋮ | ⋮ | ⋮ | ⋮ |
| 0191 | 2013/01/09 6:00 TO 9:00 | 0001 | GAME A | 001 |
| | | 0002 | GAME B | – |
| | | 0003 | GAME C | – |
| 0192 | 2013/01/09 9:00 TO 12:00 | 0001 | GAME A | – |
| | | 0002 | GAME B | 001 |
| | | 0003 | GAME C | 001 |
| 0193 | 2013/01/09 12:00 TO 15:00 | 0001 | GAME A | – |
| | | 0002 | GAME B | 002 |
| | | 0003 | GAME C | 001 |
| ⋮ | ⋮ | ⋮ | ⋮ | ⋮ |

SERVER DEVICE, AND NON-TRANSITORY COMPUTER-READABLE STORAGE MEDIUM STORING GAME PROGRAM

BACKGROUND OF THE INVENTION

Field of the Invention

The present invention relates to a server device, and a non-transitory computer-readable storage medium storing game program.

Description of Related Art

A game system that performs processing of automatically advancing a game according to a game advance condition specified by a player is known (for example, Japanese Patent Application Laid-Open No. 2009-240570).

SUMMARY OF THE INVENTION

In such a game system, while the game can be automatically advanced as the player performs a specifying operation of the game advance condition, the player needs to perform each specifying operation in each game when playing a plurality of types of games in parallel. Therefore, the specifying operations require labor of the player, and the player stops some of the games that the player has played so far.

The present invention has been made in view of the foregoing, and an objective is to reduce labor necessary for specifying operations of the player who plays a plurality of types of games in parallel, and to enable the player to easily continue to play the plurality of types of games.

A principal invention of the present invention to solve the above-described problem is a server device configured to be connected with a player terminal used by a player through a network that includes:

a screen data generation unit configured to generate screen data for displaying a screen in which a plurality of types of games is listed in the player terminal;

a reception unit configured to receive, when a game in which a game play is automatically performed from among the plurality of types of listed games and a start timing at which the game play is automatically started are specified by the player in the player terminal that displays the screen, a reservation registration request of automatic play information in which the specified game and the specified start timing are set from the player terminal;

a reservation registration unit configured to register the automatic play information of the player in advance in response to the reservation registration request from the player terminal;

a determination unit configured to determine whether automatically starting the game play of the game specified by the player at the start timing specified by the player based on the automatic play information registered in advance; and a game processing unit configured to automatically start the game play of the game at the start timing when the determination by the determination unit is affirmed.

Other characteristics of the present invention will be made clear by description of the present specification and appended drawings.

According to the present invention, labor required for a specifying operation of the player who plays a plurality of types of games can be reduced, and the plurality of types of games can be easily continued to be played.

BRIEF DESCRIPTION OF THE DRAWINGS

FIG. 4 is a diagram illustrating an example of a data structure of game information;

FIG. 6 is a diagram illustrating an example of a data structure of card information;

FIG. 7 is a diagram illustrating an example of a data structure of player information;

FIG. 8 is a diagram illustrating an example of a data structure of my game information;

FIG. 9 is a diagram illustrating an example of a data structure of possessed character information;

FIG. 10 is a diagram illustrating an example of a data structure of automatic play information;

FIG. 11 is a diagram illustrating an example of a data structure of time table information;

DETAILED DESCRIPTION OF THE INVENTION

Figure 1:
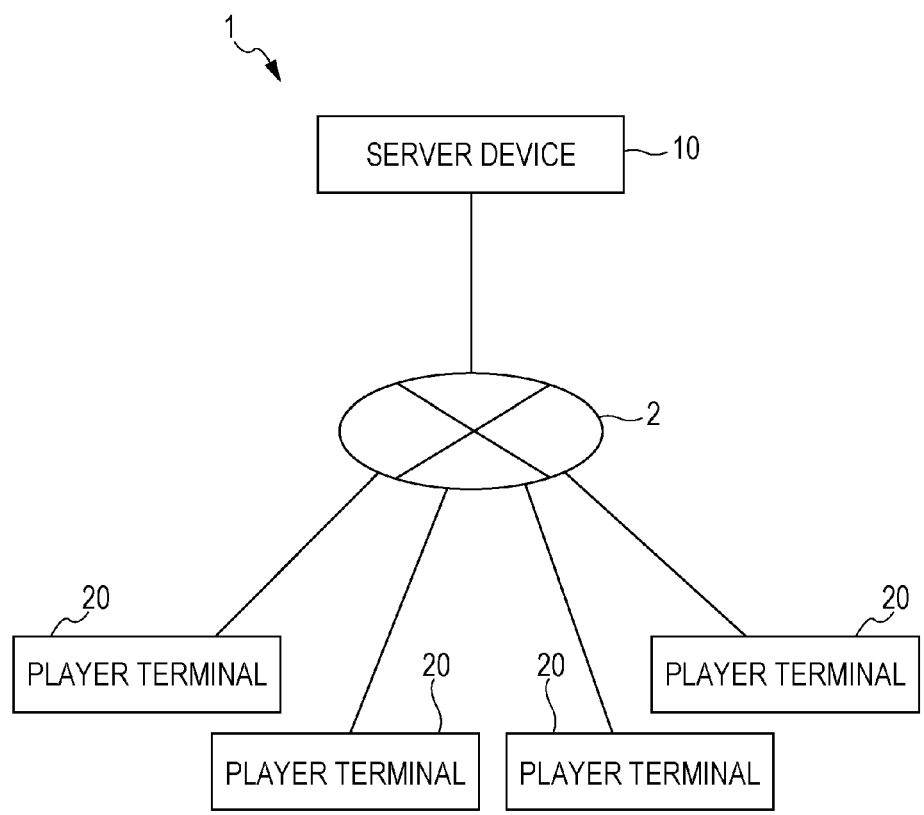
FIG. 1 is a diagram illustrating an example of an overall configuration of a game system.

At least the following matters will become clear according to the description of the present specification and the appended drawings.

That is, a server device configured to be connected with a player terminal used by a player through a network, which includes:

a screen data generation unit configured to generate screen data for displaying a screen in which a plurality of types of games is listed in the player terminal;

a reception unit configured to receive, when a game in which a game play is automatically performed from among the plurality of types of listed games and a start timing at which the game play is automatically started are specified by the player in the player terminal that displays the screen, a reservation registration request of automatic play information in which the specified game and the specified start timing are set from the player terminal;

a reservation registration unit configured to register the automatic play information of the player in advance in response to the reservation registration request from the player terminal;

a determination unit configured to determine whether automatically starting the game play of the game specified by the player at the start timing specified by the player based on the automatic play information registered in advance; and a game processing unit configured to automatically start the game play of the game at the start timing when the determination by the determination unit is affirmed.

According to such a server device, labor required for a specifying operation of the player who plays a plurality of types of games can be reduced, and the plurality of types of games can be easily continued to be played.

Further, in the server device, the reception unit may receive a transmission request of a screen displaying the number of points consumable at the start timing in advance from among the number of points set to the player when the start timing is specified by the player in the player terminal, the game processing unit may automatically start the game play of the game specified by the player by consuming the number of points set to the player, may recover the number of consumed points in accordance with elapse of time after the consumption of the number of points, and may calculate the number of points consumable at the start timing based on an elapsed time from the consumption of the points to the start timing when the reception unit has received the transmission request, and the screen data generation unit may generate screen data for displaying a screen including the number of points consumable at the start timing calculated by the game processing unit in the player terminal.

According to such a server device, how many number of points will be consumed at the start timing at which the game play is automatically started can be notified to the player in advance.

Further, in the server device, the reception unit may receive, when the quantity of recovery items that recover the number of points set to the player is specified by the player in the player terminal that displays the screen, a reservation registration request of the automatic play information in which the quantity of the specified recovery items is further set from the player terminal, and the game processing unit, when automatically performing a game play, may recover the number of points set to the player by using the specified quantity or less than the specified quantity of the recovery items based on the automatic play information registered in advance.

According to such a server device, when the game play is automatically advanced, the number of points can be automatically recovered by use of the recovery item.

Further, the server device includes a time table generation unit configured to generate a time table in which a plurality of time periods in which an automatic play can be started is set to each of the plurality of types of games, wherein the screen data generation unit may generate screen data for displaying a screen including the time table generated by the time table generation unit in the player terminal, and the reception unit may receive a reservation registration request of the automatic play information from the player terminal by the player specifying a game and a time period listed in the time table in the player terminal that displays the screen.

According to such a server device, each game and each time period are listed in the time table. Therefore, the labor required for a specifying operation of the player who plays a plurality of types of games can be further reduced.

Further, a server device configured to be connected with each of a plurality of the player terminals through the network, wherein the reservation registration unit may register the automatic play information in associated with each of a plurality of players in advance, and the game processing unit, when automatically advancing game plays of the games specified by a player and another player, may cause the game play automatically performed according to the automatic play information of the player and the game play automatically performed according to the automatic play information of the another player to be associated with each other.

According to such a server device, exchanges among players can be maintained even if the game play is automatically performed without involvement of the players.

Further, in the server device, the game processing unit, between a case of automatically advancing a game play of a game specified by the player based on the automatic play information registered in advance, and a case of advancing a game play of the game based on an operation input of the player, may make details of game plays to be advanced different.

According to such a server device, the player can enjoy the game play of each case.

Further, a non-transitory computer-readable storage medium storing game program for causing a server device configured to be connected with a player terminal used by a player through a network to execute:

screen data generation processing of generating screen data for displaying a screen in which a plurality of types of games is listed in the player terminal;

reception processing of receiving, when a game in which a game play is automatically performed from among the plurality of types of listed games and a start timing at which the game play is automatically started are specified by the player in the player terminal that displays the screen, a reservation registration request of automatic play information in which the specified game and the specified start timing are set from the player terminal;

reservation registration processing of registering the automatic play information of the player in a storage unit in advance in response to the reservation registration request from the player terminal;

determination processing of determining whether automatically starting the game play of the game specified by the player at the start timing specified by the player based on the automatic play information registered in advance; and game processing of automatically starting the game play of the game at the start timing when determination in the determination processing is affirmed.

According to such a server device, labor required for a specifying operation of the player who plays a plurality of types of games can be reduced, and the plurality of types of games can be easily continued to be played.

EMBODIMENTS

Configuration of Game System 1

FIG. 1 is a diagram illustrating an example of an overall configuration of a game system 1 according to the present embodiment. The game system 1 provides a player with various services related to a game through a network 2 (for example, the Internet and the like), and includes a server device 10 and a plurality of player terminals 20.

Configuration of Server Device 10

Figure 2:
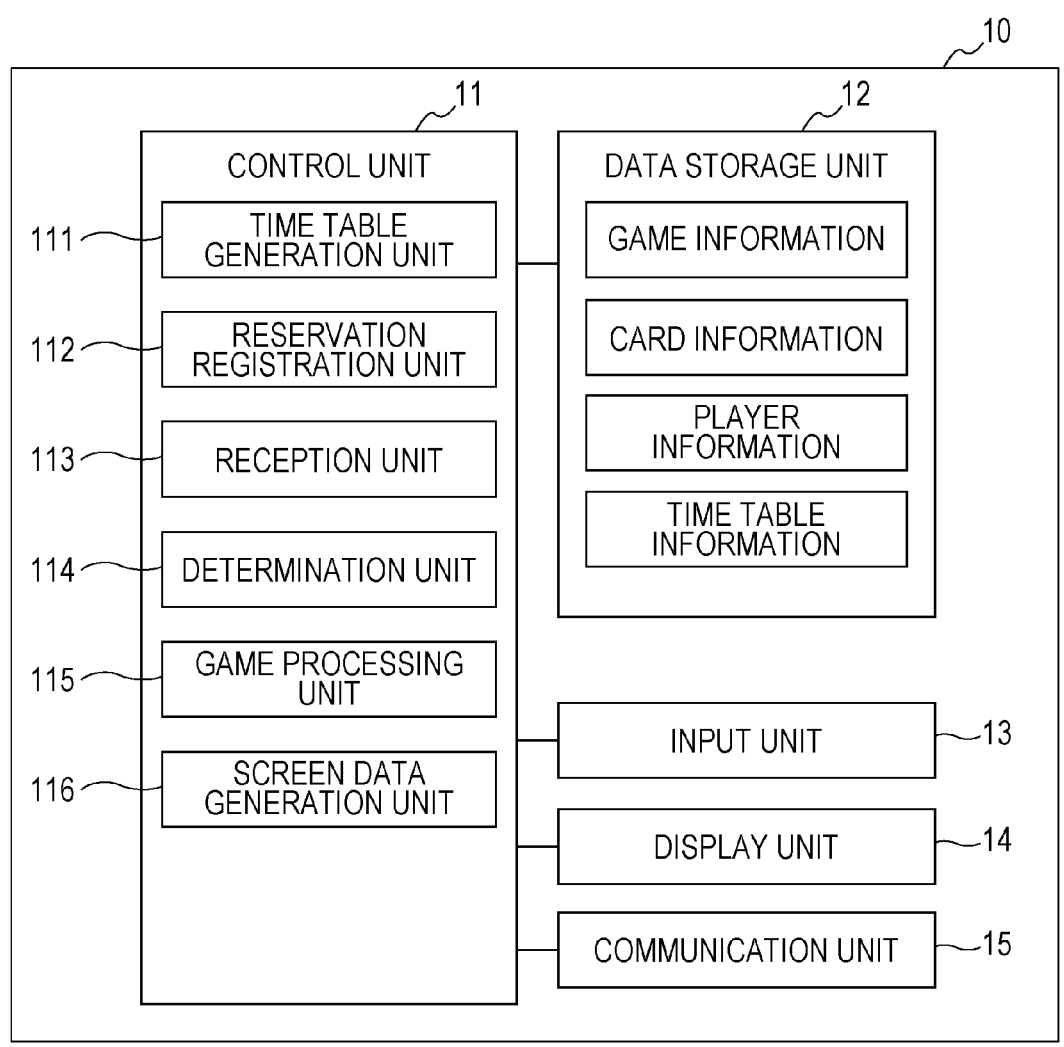
FIG. 2 is a block diagram illustrating a functional configuration of a server device.

FIG. 2 is a block diagram illustrating a functional configuration of the server device 10 according to the present embodiment.

The server device 10 is an information processing device (for example, a workstation, a personal computer, and the like) used when a system administrator and the like operate/manage the game service. The server device 10 can distribute (reply) a non-transitory computer-readable storage medium storing game program operable on the player terminal 20, and a web page (game screen, and the like) created in a markup language (HTML, and the like) according to a specification of the player terminal 20 upon receiving various commands (requests) from the player terminal 20. The server device 10 includes a control unit 11, a data storage unit 12, an input unit 13, a display unit 14, and a communication unit 15.

The control unit 11 performs data passing among units as well as controlling the entire server device 10, and is realized by a central processing unit (CPU) executing a non-transitory computer-readable storage medium storing game program stored in a predetermined memory. The control unit 11 of the present embodiment includes a time table generation unit 111, a reservation registration unit 112, a reception unit 113, a determination unit 114, a game processing unit 115, and a screen data generation unit 116.

The time table generation unit 111 has a function to generate a time table in which a plurality of time periods in which an automatic play can be started is set to each of a plurality of types of games. The time table generation unit 111 of the present embodiment generates a game schedule table as an example of the time table. In the game schedule table, events set to each game are lined up in time series.

The reservation registration unit 112 has a function to register automatic play information for automatically performing a game play in the data storage unit 12 in advance in response to a request from the player terminal 20. The automatic play information includes various types of information specified by a player.

The reception unit 113 has a function to execute processing of receiving an operation input by the player. To be specific, the reception unit 113 can receive an operation input by the player by the server device 10 receiving, through the network, operation information (a command and the like) input by the player using the player terminal 20.

The determination unit 114 has a function to execute various types of determination processing such as processing of determining whether a game play of a game specified by the player is automatically started at a start timing specified by the player based on the automatic play information registered in advance.

The game processing unit 115 has a function to perform processing of advancing a game. The game processing unit 115 in the present embodiment can perform processing of advancing a specified game (normal game play) based on an operation input performed by the player after the player logs in to the specified game, and also can perform processing of automatically advancing a game specified by the player (automatic game play). Further, in the present embodiment, the game processing unit 115 can automatically start a game play by consuming the number of points set to the player. Further, the game processing unit 115 can recover the number of consumed points in accordance with elapse of time after consumption of the number of points. Further, the game processing unit 115 can calculate, based on an elapsed time from after the consumption of points to a start timing of an automatic play, the number of points consumable at the start timing. Note that a reference time of this case may be an actual time or a time in a game.

The screen data generation unit 116 has a function to execute processing of generating screen data for displaying a game screen and an operation screen to be played by the player on the player terminal 20. The screen data generation unit 116 of the present embodiment generates HTML data as screen data corresponding to the operation screen/game screen.

The data storage unit 12 includes a read only memory (ROM) that is a read only storage area in which a system program is stored and a random access memory (RAM) that is a rewritable storage area used as a work area for arithmetic processing by the control unit 11. The data storage unit 12 is, for example, realized by a non-volatile storage device, such as a flash memory and a hard disk. The data storage unit 12 of the present embodiment at least includes game information that is information related to a game, card information that is information related to a game card as an example of game contents, player information that is information related to the player, and time table information that is information related to a time table. Note that each of the information will be described in detail.

The input unit 13 is used for inputting various data (for example, the card information and the like) by the system administrator, and the like, and is realized by, for example, a keyboard, a mouse, and the like.

The display unit 14 is used for displaying an operation screen for the system administrator based on a command from the control unit 11, and is, for example, realized by a liquid crystal display (LCD) and the like.

The communication unit 15 is used for performing communication between the server device 10 and the player terminal 20, and has a function as a reception unit that receives various data and signals transmitted from the player terminal 20, and a function as a transmission unit that transmits various data and signals to the player terminal 20 according to a command of the control unit 11. The communication unit 15 is, for example, realized by a network interface card (NIC), and the like.

Configuration of Player Terminal 20

Figure 3:
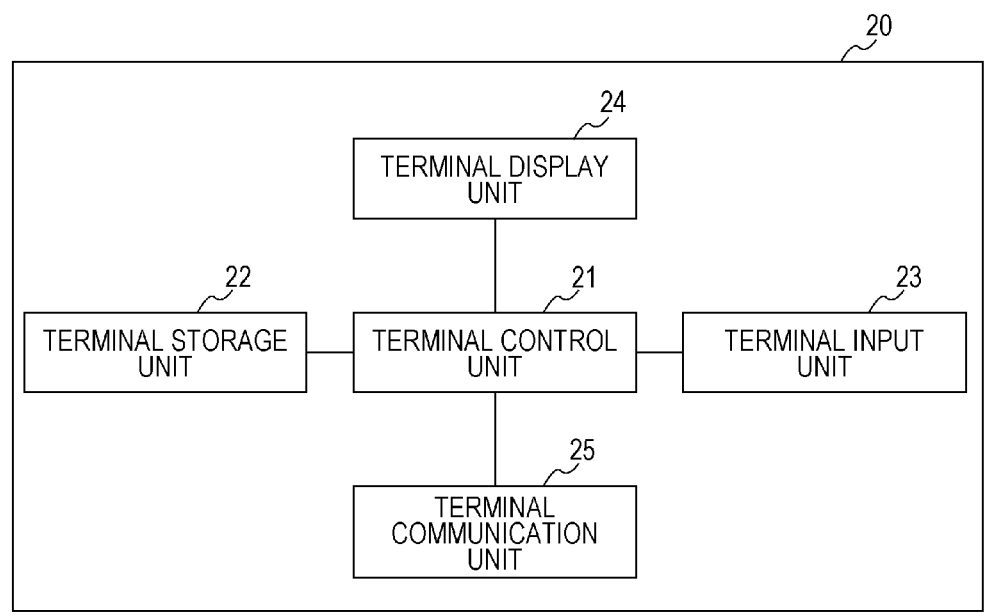
FIG. 3 is a block diagram illustrating a functional configuration of a player terminal.

FIG. 3 is a block diagram illustrating a functional configuration of the player terminal 20. The player terminal 20 of the present embodiment is an information processing device (for example, a mobile phone terminal, a smart phone, or the like) used by the player when a game is played, and can request distribution of various types of information (a non-transitory computer-readable storage medium storing game program, a web page, and the like) related to the game to the server device 10. Since the player terminal 20 has a web browser function for allowing the player to browse a web page, the web page (a game screen, and the like) distributed from the server device 10 can be displayed on a screen. The player terminal 20 includes a terminal control unit 21, a terminal storage unit 22, a terminal input unit 23, a terminal display unit 24, and a terminal communication unit 25.

The terminal control unit 21 performs data passing among units and controls the entire player terminal 20, and is realized by the central processing unit (CPU) executing a non-transitory computer-readable storage medium storing game program stored in a predetermined memory. Note that the terminal control unit 21 of the present embodiment also functions as a screen display control unit that controls a display form of the game screen displayed in the terminal display unit 24. The terminal storage unit 22 is connected to the terminal control unit 21 through a bus, and performs processing of referring to, reading out, rewriting stored data according to a command from the terminal control unit 21. The terminal storage unit 22 is realized, for example, by a flash memory, a hard disk, or the like. The terminal input unit 23 is used for performing various operations (a game operation, and the like) by the player, and is realized, for example, by an operation button, a touch panel, or the like. The terminal display unit 24 is used for displaying a game screen by a command from the terminal control unit 21, and is realized, for example, by a liquid crystal display (LCD) or the like. The terminal communication unit 25 functions as a transmission/reception unit for performing transmission/reception of various types of information between the player terminal 20 and the server device 10 through the network 2, and is realized, for example, by a network interface card (NIC), and the like.

Data Structure

FIG. 4 is a diagram illustrating an example of a data structure of the game information stored in the data storage unit 12 of the server device 10. The game information includes items (fields) such as a game ID, a game title, and event information. The game ID is identification information identifying each of a plurality of types of games. The game title is information indicating a display name of a game. The event information is information related to various events set to a game.

Figure 5:
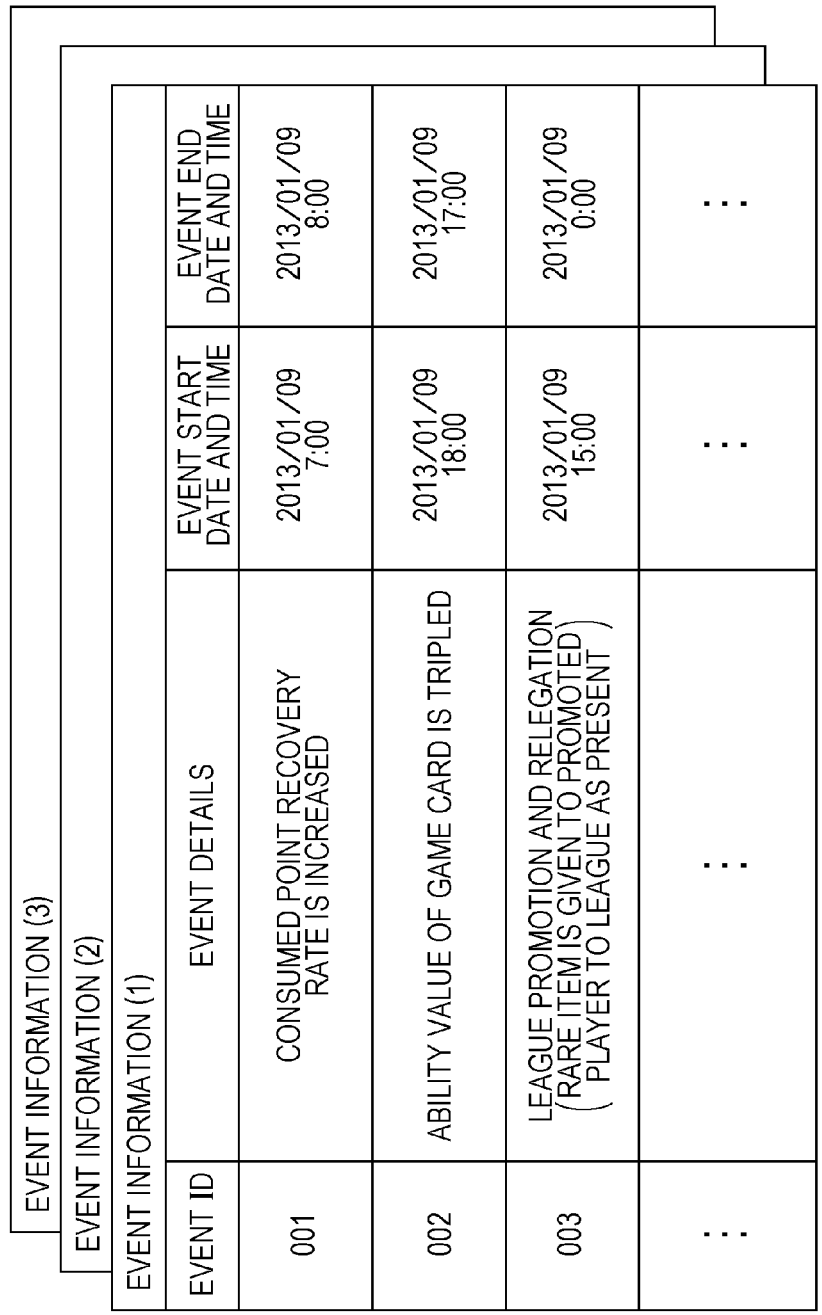
FIG. 5 is a diagram illustrating an example of a data structure of event information.

FIG. 5 is a diagram illustrating an example of a data structure of event information stored in the data storage unit 12 of the server device 10. The event information includes items (fields) such as an event ID, event details, an event start date and time, and an event end date and time. The event ID is identification information identifying an event. The event details is information indicating service details provided to the player by execution of a non-transitory computer-readable storage medium storing special game program as an event. The event start date and time is information defining a start timing at which an event is started. The event end date and time is information defining an end timing at which an event is ended.

FIG. 6 is a diagram illustrating an example of a data structure of card information stored in the data storage unit 12 of the server device 10. The card information includes items (fields), such as a card ID, a character name, a level, attack strength, defense strength, and an initial hit point (HP). The card ID is identification information identifying a game card as an example of the game contents. The game contents are, for example, items such as a game card and a figure associated with a character and the like, or a tool/ability that can be used in a game. In the present embodiment, a game card as an example of game contents is used in a virtual space in a game. The character name is information indicating a display name of a character associated with a game card. The level, the attack strength, the defense strength, and the hit point (HP) of a character are parameters indicating ability values initially set to a character.

FIG. 7 is a diagram illustrating an example of a data structure of player information stored in the data storage unit 12 of the server device 10. The player information includes items, such as a player ID, virtual currency, my game information, and automatic play information. The player ID is identification information identifying the player. The virtual currency is an example of a game value, and is information indicating an amount of the virtual currency possessed by the player. The player can purchase and possess the virtual currency. The my game information is information related to a game (my game) registered by the player. When the player selects a game that the player wishes to register as the my game from among a plurality of types of games, the game is registered to the my game information associated with the player. The automatic play information is information for automatically advancing a game play by the game processing unit 115. The automatic play information is registered in advance according to an operation of the player before a game play is automatically started. Various types of information related to an automatic play such as a game specified by the player, a start timing, and the number of points are set to the automatic play information of the present embodiment.

FIG. 8 is a diagram illustrating an example of a data structure of the my game information. The my game information includes items such as a my game ID, a game ID, a player level, a friend player ID, a consumption point, the number of recovery items, a recovery time of the consumption point, and possessed card information. The my game ID is identification information identifying a my game. The game ID is identification information of a game registered as the my game. The player level is information indicating a level of the player in the my game. The friend player ID is information indicating another player registered in a friend list in the my game. The consumption point is information indicating a quantity of the consumption points possessed by the player in the my game. The number of recovery items is information indicating the quantity of recovery items possessed by the player in the my game. The recovery time of the consumption point is information indicating a recovery time per unit point when the consumption point consumed in the my game is recovered in accordance with elapse of time. The possessed card information is information indicating a game card possessed by the player in the my game (hereinafter, also referred to as a possessed card).

FIG. 9 is a diagram illustrating an example of a data structure of possessed card information. The possessed card information includes items, such as a possessed card ID, a level of the possessed card, attack strength, defense strength, and an acquisition date and time. The possessed card ID is identification information identifying a possessed card. The level of a possessed card, the attack strength, and the defense strength are parameters (card parameters) indicating ability values at the present moment set to a character corresponding to a possessed card. These various parameters are updated according to a result of a battle game, and the like. The acquisition date and time is information indicating a date and time at which the player acquired the possessed card.

FIG. 10 is a diagram indicating an example of a data structure of automatic play information. The automatic play information includes items such as an automatic play ID, a my game ID, a game start date and time, the number of points to be consumed, and the number of recovery items to be used. The automatic play ID is identification information identifying automatic play information. The my game ID is identification information identifying a my game in which an automatic play is performed based on the automatic play information. The game start date and time is information indicating a start timing at which an automatic play is started. The number of points to be consumed is information indicating the number of points consumed when an automatic play is performed. The number of recovery items to be used is information indicating the quantity of recovery items to be used in an automatic play. As described above, reservation registration of a plurality of pieces of automatic play information can be performed for each my game.

FIG. 11 is a diagram describing time table information stored in the data storage unit 12 of the server device 10. The time table information is information indicating a time table in which a plurality of time periods in which an automatic play can be started is set to each of a plurality of types of games. The time table of the present embodiment is an event schedule table that lists various events held in each game for each time period. The time table information includes items such as a schedule ID, a time period, a game ID, a game title, and an event ID. The schedule ID is identification information identifying each schedule in the time table. The time period is information in which whole time in which an automatic play can be started is divided into a plurality of sections, and a start time to an end time in each section is defined. The game ID is identification information identifying a game that can be subjected to reservation registration of an automatic play. The game title is information indicating a display name of a game that can be subjected to reservation registration of an automatic play. The event ID is identification information identifying an event held in each time period.

<Outline of Game>

Here, an outline of a game provided by the game system 1 of the present embodiment will be described. In the game system 1, a plurality of types of games performed using a game card (a virtual card used in a virtual space in the game) is provided.

<My Game>

In the game system 1 of the present embodiment, the player can specify one or more games from among the plurality of types of provided game, and can register the games as the my games. The player can easily play the game without performing a complicated operation for a start of the game by registering the game as the my game.

In the game registered as the my game, the player can possess a plurality of game cards associated with game characters. The player can perform a battle game using a game card (character) selected from among the plurality of possessed game cards. The control unit 11 determines an enemy character that serves as the other side of a battle against the character selected by the player, and determines an outcome of the batter game between the characters based on the various parameters set to the characters (the level, the attack strength, the defense strength, the hit point (HP)/vitality, and the like).

In a game registered as the my game, the player can start a battle against the other side by consuming a consumption point necessary for performing a battle game. However, there is a case in which the battle game cannot be continued due to a lack of the consumption point caused by repetition of battles. To resume a battle game under such circumstances, the player needs to recover the consumption point. In the present embodiment, the player can recover the consumption point by using a recovery item. Further, the player can recover the consumption point in accordance with elapse of time without using the recovery item.

<Automatic Game Play>

In the game system 1 of the present embodiment, in a case where the player registers a plurality of types of games as the my games, the player plays the games in parallel. When playing the plurality of types of games in parallel, the player logs in to each game, and performs an operation input for advancing a game for each game. When such an operation is performed, the game processing unit 115 executes a normal game play based on operation information (normal game play).

However, in the game system 1 of the present embodiment, new games are provided one after another. Therefore, there is a case in which the my games registered by the player are excessively increased. If so, when performing a normal play for each of the my games, the player needs to perform each operation input. As a result, each game operation requires labor, and the player sometimes stops some of the games that the player has played so far.

To deal with such a situation, the game system 1 of the present embodiment can automatically advance a game specified by the player based on automatic play information registered in advance (automatic game play). The player can set the automatic game play to some specified games from among a plurality of my games, or can set the automatic game play to all of the my games. This enables the games to be automatically advanced without causing the player to be involved in the game play even if the my games are excessively increased. Therefore, the player can continue to play the my games.

By the way, to set the automatic game play, the player needs to register the automatic play information in advance. When performing reservation registration of the automatic play information with respect to a plurality of my games, the player logs in to each game, and performs a setting operation of the automatic play information for each game. If so, each setting operation requires labor, and the player may stop some of the games that the player has played so far without even performing setting of the automatic play information.

Therefore, the game system 1 of the present embodiment realizes easy reservation registration of the automatic play information by using a time table (game schedule table). In the time table of the present embodiment, a plurality of types of automatically playable games is listed for each time period. By specifying a game from among the plurality of types of listed my games, the player can perform reservation registration of the automatic play information to the game. Further, by specifying a time period from among the plurality of listed time periods, the player can automatically start a game play in the time period.

When an event is set to the my game, a time period in which the event is held is indicated in the time table. If the time periods in which events are held overlap with each other between the games, the player can participate in both events without giving up participation to any of the events only by performing reservation registration of the automatic play information to the games to which the respective events are set.

As described above, for the player who plays a plurality of types of my games in parallel, the labor required for the specifying operation of the automatic play information is reduced. Therefore, the player can easily continue to play the plurality of types of my games.

<Operation of Game System 1>

Figure 12:
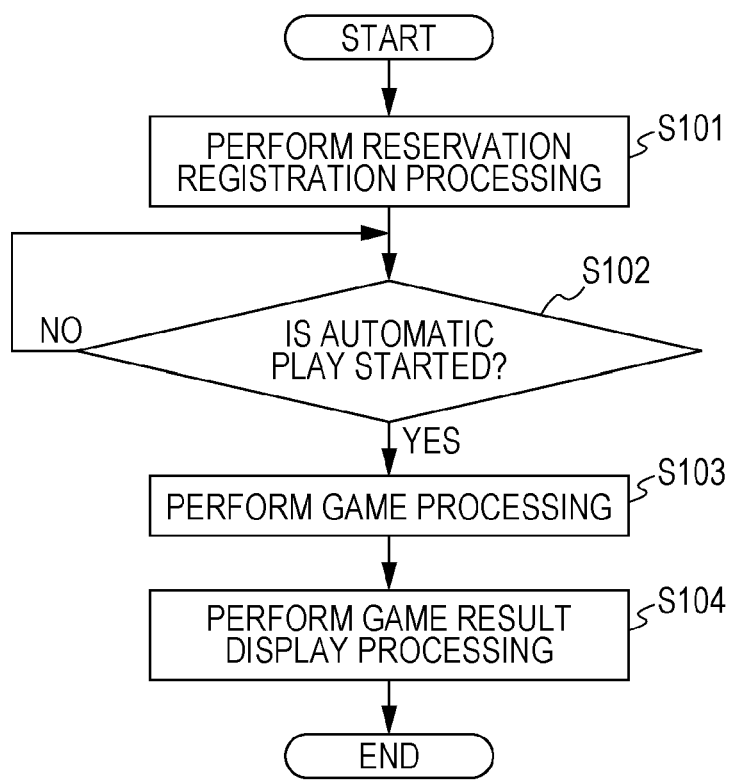
FIG. 12 is a flowchart for describing an operation example of the game system.

FIG. 12 is a flowchart for describing an operation example of the game system 1 according to the present embodiment.

First, the game system 1 performs reservation registration processing (S101).

To be specific, in the player terminal 20, when having received an operation input of the player from the terminal input unit 23, the terminal control unit 21 transmits a transmission request of an operation screen (web page) for allowing the player to perform the reservation registration of the automatic play information to the server device 10 through the terminal communication unit 25 together with a player ID.

When having received, by the reception unit 113, the transmission request from the player terminal 20 together with the player ID, the server device 10 causes the time table generation unit 111 to generate a time table. That is, the time table generation unit 111 identifies a game ID corresponding to the my game of the player by referring to the player information illustrated in FIG. 7 and the my game information illustrated in FIG. 8, and generates time table information illustrated in FIG. 11 by referring to the game information illustrated in FIG. 4 and the event information illustrated in FIG. 5 to identify an event of the my game. In the present embodiment, a game schedule list in which a plurality of time periods in which an automatic plays can be started is set to each of a plurality of types of my games is generated based on the time table information illustrated in FIG. 11 (see FIG. 13).

The server device 10 causes the screen data generation unit 116 to generate screen data (HTML file) for displaying an operation screen (web page) including the game schedule list generated by the time table generation unit 111 in the player terminal 20. The server device 10 transmits the screen data (HTML file) of the operation screen (webpage) generated in this way to the player terminal 20 as a requestor through the network.

Figure 13:
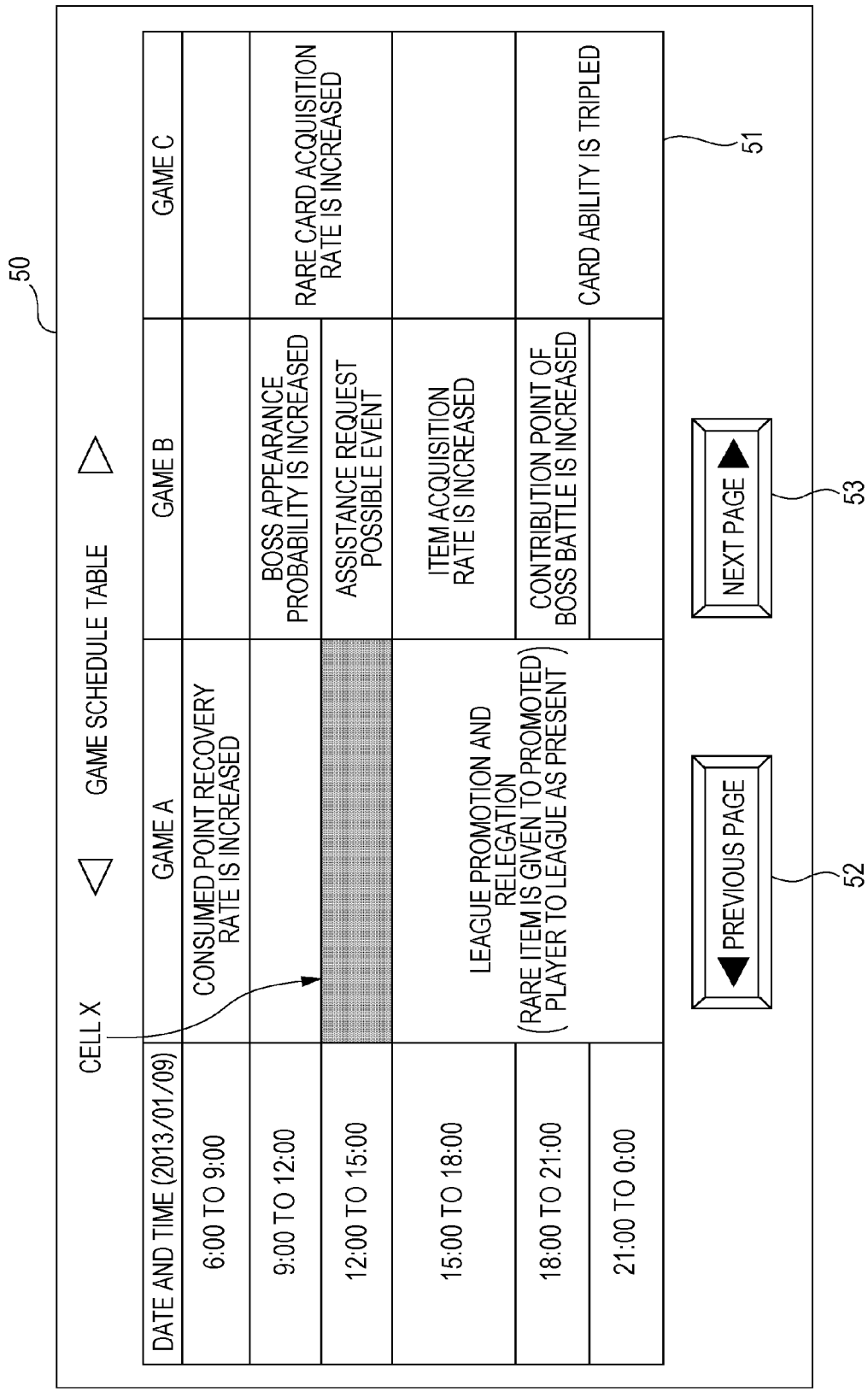
FIG. 13 is a diagram illustrating an example of an operation screen including a game schedule table.

FIG. 13 is a diagram illustrating an example of an operation screen 50 including the game schedule table.

The operation screen 50 includes a game schedule table 51 and operation buttons 52 and 53. The player can see schedules of different dates and times by selecting the operation buttons 52 and 53. Further, the player can transit to an operation screen for performing reservation registration of a my game corresponding to the cell by selecting any cell (unit area) from the game schedule table 51. Here, subsequent decryption will be given on the assumption that a cell X is selected by an operation of the player. The cell X is an area indicating a time period 12:00 to 15:00 of a game A.

Figure 14:
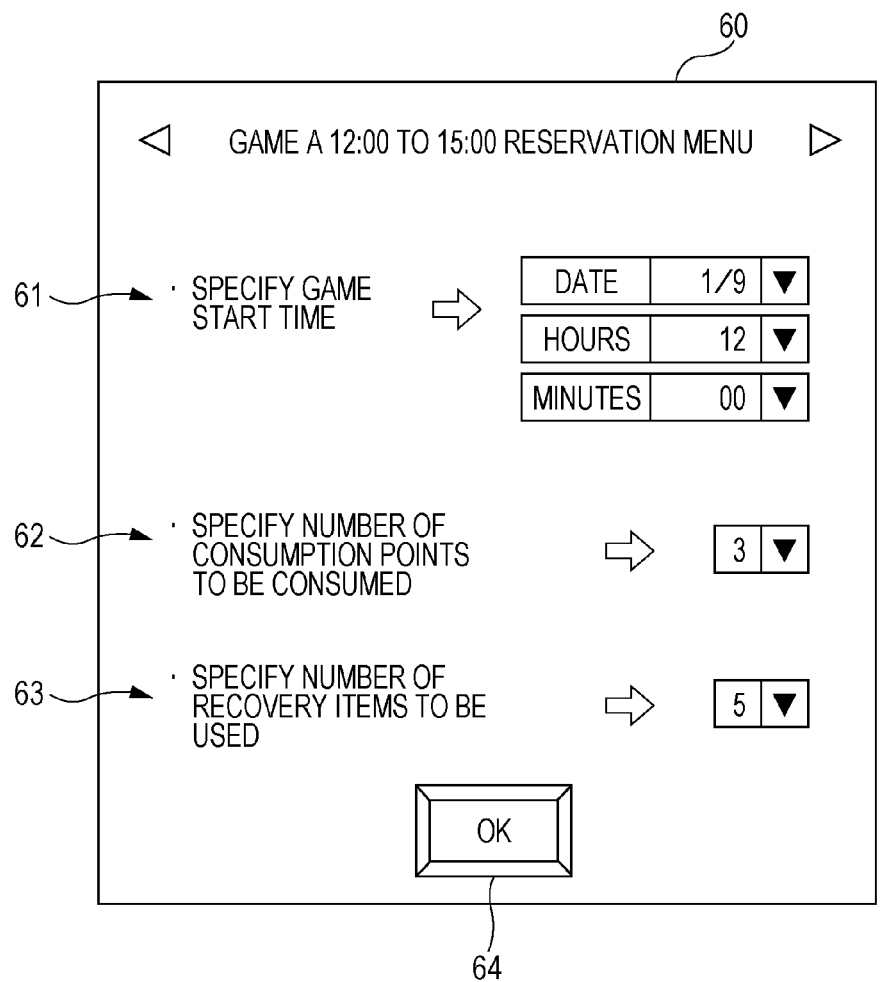
FIG. 14 is a diagram illustrating an example of an operation screen for performing reservation registration.

FIG. 14 is a diagram illustrating an example of an operation screen 60 for performing reservation registration.

The operation screen 60 is a screen after transition as a result of the cell X being selected by the player on the operation screen 50 illustrated in FIG. 13, and includes a game start time input area 61, a consumption point input area 62, a recovery item input area 63, and an operation button 64. The player can specify the automatic play information (a start timing, the number of points to be consumed, and the number of recovery items) related to the cell X (the time period 12:00 to 15:00 of the game A) while the operation screen 60 is displayed in the player terminal 20.

The game start time input area 61 is an area for inputting a timing to start automatic game play. In the game start time input area 61, a more specific time can be selected from among the time periods selected from the game schedule table 51.

The consumption point input area 62 is an area for inputting the number of points to be consumed when an automatic game play is performed. In the consumption point input area 62, the number of points that is equal to or less than the number of maximum consumable points can be specified. The number of maximum consumable points is automatically calculated and displayed in the consumption point input area 62 when the start time is specified by the player in the game start time input area 61. The number of maximum consumable points is calculated as follows.

First, the reception unit 113 in the server device 10 receives, when the start time is specified by the player in the game start time input area 61, a transmission request of a screen indicating the number of maximum consumable points from the player terminal 20 at the start time.

When the reception unit 113 has received the transmission request, the game processing unit 115 in the server device 10 then identifies a consumption point recovery time (a recovery time per unit point) from the my game information illustrated in FIG. 8, and calculates the number of maximum consumable points at the start time based on the elapsed time from the consumption of the points to the start time. Following that, the screen data generation unit 116 generates screen data for displaying, in the player terminal 20, a screen including the number of maximum consumable points at the start timing calculated by the game processing unit 115.

The recovery item input area 63 is an area for inputting the number of recovery items to be used during an automatic game play. When the quantity of the recovery items is specified in the recovery item input area 63, the recovery items are repeatedly used by the specified quantity, and the number of points set to the player can be recovered, when the number of points set to the player becomes insufficient in the automatic game play. That is, the automatic game play is repeatedly performed until the specified quantity of the recovery items are used up.

The operation button 64 is a button for fixing each input value specified by the player through a game start time input are 61, a consumption point input area 62, and a recovery item input area 63.

In this way, when the operation button 64 is pressed by the player after a specifying operation of the automatic play information (the start timing, the number of points to be consumed, and the number of recovery items) is performed related to a cell X (the time period 12:00 to 15:00 of the game A) while the operation screen illustrated in FIG. 14 is displayed in the player terminal 20, a reservation registration request requesting the reservation registration of the automatic play information is transmitted from the player terminal 20 to the server device 10 together with the player ID.

When having received, by the reception unit 113, the reservation registration request together with the player ID transmitted from the player terminal 20, the server device 10 then performs the reservation registration of the automatic play information (the start timing, the number of points to be consumed, and the number of recovery items) specified by the player by the reservation registration unit 112. That is, the reservation registration unit 112 identifies the automatic play information of the player from the player information illustrated in FIG. 7, and updates the automatic play information of the player illustrated in FIG. 10.

Next, the game system 1 determines whether starting the automatic play (S102).

To be specific, the server device 10 performs the determination processing by the determination unit 114. The determination unit 114 compares the start time specified by the player and a current time to determine whether starting an automatic game play based on the automatic play information illustrated in FIG. 10.

Next, the game system 1 performs game processing based on a determination result of step S102 (S103).

To be specific, the server device 10 performs the game processing by the game processing unit 115. When the determination is affirmed by the determination unit 114 (YES in S102), the game processing unit 115 automatically starts a game play of the my game specified by the player at the start time specified by the player based on the automatic play information illustrated in FIG. 10. At this time, the game processing unit 115 consumes the number of points to be consumed specified by the player and updates the consumption point of the my game information illustrated in FIG. 8 based on the automatic play information of FIG. 10. Further, when the consumption point becomes insufficient in the automatic game play, the game processing unit 115 uses the recovery items by the quantity specified by the player to recover the consumption point based on the automatic play information illustrated in FIG. 10, and updates the consumption point and the recovery item of the my game information illustrated in FIG. 8. Note that, at this time, the specified quantity or less than the specified quantity of the recovery items may be used instead of using all of the specified quantity of the recovery items specified by the player.

Next, the game system 1 performs game result display processing after the automatic game play ends (S104).

To be specific, in the player terminal 20, when having received an operation input of the player from the terminal input unit 23, the terminal control unit 21 transmits a transmission request of a game screen (web page) indicating a game result to the server device 10 through the terminal communication unit 25.

When having received, by the reception unit 113, the transmission request from the player terminal 20, the server device 10 causes the screen data generation unit 116 to generate screen data indicating the game result. The server device 10 then transmits the screen data generated by the screen data generation unit 116 to the player terminal 20 as the requestor through the network.

When having received the screen data transmitted from the server device 10, the player terminal 20 displays a game screen indicating the game result based on the received screen data. The player can confirm the game result (various types of information including the item information and the parameter information automatically fluctuated by the automatic game play, and the like) by viewing the game screen.

As described above, according to the game system 1 of the present embodiment, even in a case where the player registers a plurality of types of games in the my game, the game play of the my game specified by the player can be automatically advanced at the start time specified by the player. Further, by use of the time table (game schedule table), the reservation registration of the automatic play information for advancing the automatic game play can be easily performed. Therefore, for the player who plays the plurality of types of my games in parallel, the labor required for the specifying operation of the automatic play information is reduced. Therefore, the player can easily continue to play the plurality of types of my games.

Other Embodiments

The above-described embodiment is given for easy understanding of the present invention, and is not given for a limited construction of the present invention. The present invention can be altered and improved without departing from the gist thereof, and includes equivalents thereof. Especially, embodiments described below are included in the present invention.
<Time Table>

While, in the present embodiment described above, a time table in which a plurality of types of my games is set has been exemplarily described, the present invention is not limited to the example, and a game other than my game may be set to the time table. For example, a recommended game, a trial game, and the like may be set to the time table.

Further, while, in the above-described embodiment, a time table in which a plurality of time periods is set to each of the plurality of types of games has been exemplarily described, the present invention is not limited to the example. For example, a game table in which only the plurality of types of games is set without setting the plurality of time periods may be employed.

Further, in the present embodiment described above, a screen including a game result of a my game in which an automatic game play has been performed may be displayed before the operation screen 50 including the time table (game schedule table) is displayed in the player terminal 20.

Further, in the present embodiment described above, a calendar function in which a private schedule can be registered as calendar information for each player may be provided in a game system 1, and the time table (game schedule table) may be linked with the calendar function.

For example, the time table generation unit 111 identifies a time period in which a private schedule is registered by referring to the calendar information of the player (searches for a time period in which the player is busy). The time table generation unit 111 then extracts an event to be held in the identified time period by referring to the event information illustrated in FIG. 5, and generates a time table (game schedule table) including the event. At this time, highlighting for prompting the reservation registration of the event may be performed in the time table.
<Reservation Registration>

In the present embodiment described above, charging may be performed in a game when the reservation registration of the automatic play information is performed. For example, the reservation registration may be permitted subject to payment of a predetermined amount of virtual currency. Further, the reservation registration may be permitted subject to an exchange with a reservation ticket purchased by the player.

Further, in the present embodiment described above, when the player performs a log-in and attempts to start a normal game play after the reservation registration of the automatic play information has been performed and before an automatic game play is started, a game screen indicating that the reservation registration is ongoing, and error processing may be performed.

Further, while, in the present embodiment described above, the start time, the number of points to be consumed, and the number of recovery items to be used have been exemplarily described as the automatic play information subjected to the reservation registration, the present invention is not limited to the example. For example, the automatic play information subject to the reservation registration may be varied according to event details set to a my game specified by the player. To be specific, when the event details are an "assistance request possible event", "the number of accepting the assistance request" may be further able to be specified on the operation screen illustrated in FIG. 14.

Further, while, in the present embodiment described above, a case in which a date and time to start an automatic play is specified when reservation registration of the automatic play information is performed has been exemplarily described, the present embodiment is not limited to the example, and only a date or a time may be specified, or the reservation registration may be repeatedly performed such as every week or every day.

Further, in the present embodiment described above, by the player specifying a time period in the time table, in which the player wishes an automatic play, the present invention, in which the reservation registration of the automatic play information is performed, is not limited to the embodiment. For example, a calendar function in which a private schedule can be registered for each player as calendar information is provided in the game system 1. Then, even if the start time of the automatic game play is not specified, the reservation registration unit 112 identifies a time period in which a private schedule is registered (searches for a time period in which the player is busy) by linking to the calendar function and referring to the calendar information of the player, and automatically registers the start time to the identified time period.

Other than the above, the reservation registration unit 112 may be linked with a calendar function that has already been installed in the player terminal 20. For example, the reservation registration unit 112 refers to calendar information registered in the player terminal 20, and identifies (searches for) a time period in which the player is busy.

<Automatic Game Play>

In the present embodiment described above, a case in which the game processing unit 115 can perform processing of advancing the game (normal game play) based on an operation input performed by the player after the player logs in to the game, and a case in which a processing of automatically advancing a game (automatic game play) can be performed based on the automatic play information registered in advance have been described. Details of the game plays may be made different in the case of performing a normal game play and the case of performing an automatic game play.

For example, in the normal game play, a special item or a game card are obtainable by the player. However, in the automatic game play, such an item and a card may be made unobtainable. Further, while, in the normal game play, the ability value is raised by 10 points as a game result, in the automatic game play, the ability value may be raised by 5 points.

Further, while, in the normal game play, a non-transitory computer-readable storage medium storing game program may be configured to generate a game scene (a scene in which an item is selected, a course is selected, or the like) that prompts the player to select something, in the automatic game play, a non-transitory computer-readable storage medium storing game program may be configured not to generate a game scene (or to delete the scene) that prompts the player to select something.

Further, in the present embodiment described above, a non-transitory computer-readable storage medium storing game program may be configured such that, when automatically advancing a game play of a my game specified by a player and a game play of a my game specified by another player, the game processing unit 115 causes the automatic game play of the player and the automatic game play of the another player to be associated with each other when the my games specified by the respective players are the same (for example, the players cooperate to defeat the same enemy character, a player responds to an assistance request by a predetermined number of times, or the like). This can maintain the relationship between the players even in a case where a game play is automatically advanced.

Further, while, in the present embodiment described above, a case in which the player cannot be involved in the game play during execution of an automatic game play has been exemplarily described, the player may be able to be temporarily involved in the game play during the execution of an automatic game play.

For example, when an operation input from the player is given during the execution of an automatic game play, the game processing unit 115 temporarily stops the execution of the automatic game play. The game processing unit 115 then starts the execution of the automatic game play again in a state where the operation input has been reflected.

Further, when an operation input from the player is given during the execution of an automatic game play, the game processing unit 115 may switch the game play from the automatic game play to a normal game play.

<Server Device>

In the present embodiment described above, the game system 1 provided with one server device 10 has been exemplarily described as an example of a server device. However, the game system 1 is not limited to this example, and may be provided with a plurality of server devices 10 as an example of the server device. That is, a plurality of server devices 10 is connected through a network 2, and each of the server devices 10 may perform various types of processing in a distributed manner.

For example, the server device 10 may be distributed to a plurality of game server devices and a management server device. Each game server device may execute game processing related to an automatic game play and processing related to a game result, and the management server device may execute the reservation registration processing related to reservation registration of the automatic play information and the determination processing of a start timing of an automatic game play.

<Information Processing Device>

In the above-described game system 1 in the present embodiments, an example has been described, in which various types of information processing are executed based on a game non-transitory computer-readable storage medium storing game program by the server device 10 and the player terminal 20 in cooperation with each other. However, the game system 1 is not limited to the example. The above-described various types of information processing may be executed by the player terminal 20 alone or by the server device 10 alone as an information processing apparatus based on the game non-transitory computer-readable storage medium storing game program.

Further, it may be configured such that the player terminal 20 bares a part of the functions as the information processing apparatus. In this case, the server device 10 and the player terminal 20 configure the information processing apparatus.

Note that the information processing apparatus is an example of a computer including a processor and a memory.

What is claimed is:

1. A game system comprising a server device configured to be connected with a player terminal used by a player through a network, comprising:
    a screen data generation unit configured to generate screen data for displaying a screen in which a plurality of types of games is listed in the player terminal;
    wherein the plurality of types of games comprises a battle game involving game cards representative of game characters utilized in battle;
    a reception unit configured to receive, when a game in which a game play is automatically performed from among the plurality of types of listed games and a start timing at which the game play is automatically started are specified by the player in the player terminal that displays the screen, a reservation registration request of automatic play information in which the specified game and the specified start timing are set from the player terminal;
    a reservation registration unit configured to register the automatic play information of the player in advance in response to the reservation registration request from the player terminal;
    a determination unit configured to determine whether a timing to automatically start the game play of the game specified by the player is the start timing specified by the player based on the automatic play information registered in advance; and
    a game processing unit configured to automatically start the game play of the game at the start timing when the determination by the determination unit is affirmed.

2. The game system according to claim 1, wherein
the reception unit
receives a transmission request of a screen displaying the number of points consumable at the start timing from among the number of points set to the player when the start timing is specified by the player in the player terminal,
the game processing unit
automatically starts the game play of the game specified by the player by consuming the number of points set to the player,
recovers the number of consumed points in accordance with elapse of time after the consumption of the number of points, and
calculates the number of points consumable at the start timing based on an elapsed time from the consumption of the points to the start timing when the reception unit has received the transmission request, and
the screen data generation unit
generates screen data for displaying a screen including the number of points consumable at the start timing calculated by the game processing unit in the player terminal.

3. The game system according to claim 1, wherein
the reception unit
receives, when the quantity of recovery items that recovers the number of points set to the player is specified by the player in the player terminal that displays the screen, a reservation registration request of the automatic play information in which the quantity of the specified recovery items is further set from the player terminal, and
the game processing unit,
when automatically performing a game play, recovers the number of points set to the player by using the specified quantity or less than the specified quantity of the recovery items based on the automatic play information registered in advance, and automatically starts the game specified by the player by consuming the number of points.

4. The game system according to claim 1, comprising:
a time table generation unit configured to generate a time table in which a plurality of time periods in which an automatic play can be started is set to each of the plurality of types of games, wherein
the screen data generation unit
generates screen data for displaying a screen including the time table generated by the time table generation unit in the player terminal, and
the reception unit
receives the reservation registration request of the automatic play information from the player terminal by the player specifying a game and a time period listed in the time table in the player terminal that displays the screen.

5. The game system according to claim 1,
further configured to be connected with each of a plurality of the player terminals through the network, wherein
the reservation registration unit
registers the automatic play information in associated with each of a plurality of players in advance, and
the game processing unit,
when automatically advancing game plays of the games specified by a player and another player,
causes the game play automatically performed according to the automatic play information of the player and the game play automatically performed according to the automatic play information of the another player to be associated with each other.

6. The game system according to claim 1, wherein
the game processing unit,
between a case of automatically advancing a game play of a game specified by the player based on the automatic play information registered in advance, and a case of advancing a game play of the game based on an operation input of the player, makes details of game plays to be advanced different.

7. A non-transitory computer-readable storage medium storing game program for causing a server device configured to be connected with a player terminal used by a player through a network to execute:
screen data generation processing of generating screen data for displaying a screen in which a plurality of types of games is listed in the player terminal;
wherein the plurality of types of games comprises a battle game involving game cards representative of game characters utilized in battle;
reception processing of receiving, when a game in which a game play is automatically performed from among the plurality of types of listed games and a start timing at which the game play is automatically started are specified by the player in the player terminal that displays the screen, a reservation registration request of automatic play information in which the specified game and the specified start timing are set from the player terminal;
reservation registration processing of registering the automatic play information of the player in a storage unit in advance in response to the reservation registration request from the player terminal;
determination processing of determining whether a timing to automatically start a game play of the game specified by the player is the start timing specified by the player based on the automatic play information registered in advance; and
game processing of automatically starting the game play of the game at the start timing when determination in the determination processing is affirmed.

8. The server device according to claim 1, wherein the game processing unit is further configured to automatically start the game play of the game at the start timing when the determination by the determination unit is affirmed in parallel with one or more other ones among the plurality of types of listed games that are scheduled with a timing that overlaps the start timing.

* * * * *